US010282653B1

(12) United States Patent
DeBates et al.

(10) Patent No.: US 10,282,653 B1
(45) Date of Patent: May 7, 2019

(54) RFID TAGS IN WEARABLES

(71) Applicant: Motorola Mobility LLC, Chicago, IL (US)

(72) Inventors: Scott DeBates, Crystal Lake, IL (US); Douglas Lautner, Round Lake, IL (US); Jagatkumar Shah, Lake In The Hills, IL (US); Mary Hor-Lao, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/224,640

(22) Filed: Dec. 18, 2018

Related U.S. Application Data

(63) Continuation of application No. 15/360,909, filed on Nov. 23, 2016.

(51) Int. Cl.
G06K 7/10 (2006.01)
G06F 1/16 (2006.01)
G06K 19/077 (2006.01)
G06K 19/02 (2006.01)
G06Q 10/08 (2012.01)

(52) U.S. Cl.
CPC ....... *G06K 19/07762* (2013.01); *G06F 1/163* (2013.01); *G06K 7/10366* (2013.01); *G06K 19/027* (2013.01); *G06K 19/077* (2013.01); *G06K 19/07749* (2013.01); *G06Q 10/087* (2013.01)

(58) Field of Classification Search
USPC ........................................................ 235/492
See application file for complete search history.

(56) References Cited

U.S. PATENT DOCUMENTS

| 5,461,385 A | 10/1995 | Armstrong et al. |
| 6,176,425 B1 | 1/2001 | Harrison et al. |
| 6,714,133 B2 | 3/2004 | Hum et al. |
| 6,828,902 B2 | 12/2004 | Casden |

(Continued)

FOREIGN PATENT DOCUMENTS

| DE | 838460 | 5/1952 |
| EP | 2897084 | 7/2015 |

(Continued)

OTHER PUBLICATIONS

"Extended European Search Report", EP Application No. 17202482.0, dated Apr. 24, 2018, 8 pages.

(Continued)

*Primary Examiner* — Michael G Lee
*Assistant Examiner* — David Tardif
(74) *Attorney, Agent, or Firm* — Wolfe-SBMC

(57) ABSTRACT

An article of manufacture comprises a wearable, stretchable synthetic or natural textile article. At least one RFID tag is mounted on the wearable, stretchable synthetic or natural textile article. A stretch-activated switch on the at least one RFID tag has a first mode and a second mode. The first mode is associated with a first RFID tag state and the second mode is associated with a second RFID tag state. The stretch-activated switch comprises a ground contact, an RFID enable contact and a contact to slidably engage the ground contact and the RFID enable contact to transition between the first RFID tag state and the second RFID tag state.

20 Claims, 10 Drawing Sheets

(56) References Cited

U.S. PATENT DOCUMENTS

| | | |
|---|---|---|
| 7,667,589 B2 | 2/2010 | Desmons et al. |
| 7,893,813 B2 | 2/2011 | Nikitin et al. |
| 8,120,461 B2 | 2/2012 | Zimmerman et al. |
| 8,487,769 B2 | 7/2013 | Lindsay et al. |
| 9,000,883 B2 | 4/2015 | Talty et al. |
| 9,113,823 B2 | 8/2015 | Yuen et al. |
| 9,313,559 B2 | 4/2016 | Gravelle et al. |
| 9,569,777 B2 * | 2/2017 | Colby ............... G06Q 20/4012 |
| 2003/0173408 A1 | 9/2003 | Mosher et al. |
| 2008/0088473 A1 | 4/2008 | Kim et al. |
| 2008/0238799 A1 * | 10/2008 | Tsushima ............ H01Q 1/2216 343/788 |
| 2011/0057042 A1 | 3/2011 | Duggan et al. |
| 2012/0062366 A1 | 3/2012 | Pappu et al. |
| 2013/0203347 A1 | 8/2013 | Moosavi |
| 2014/0097944 A1 | 4/2014 | Fastert et al. |
| 2014/0278125 A1 | 9/2014 | Balakrishnan et al. |
| 2014/0319225 A1 | 10/2014 | Van Rens |
| 2016/0000374 A1 * | 1/2016 | Dandekar ............ A61B 5/0002 600/301 |
| 2016/0338798 A1 * | 11/2016 | Vora ...................... A61B 90/98 |
| 2017/0127155 A1 | 5/2017 | Zheng et al. |
| 2017/0255798 A1 | 9/2017 | Carey |
| 2017/0265810 A1 * | 9/2017 | Van De Vyver ..... A61D 17/008 |
| 2018/0142394 A1 | 5/2018 | DeBates et al. |
| 2018/0144164 A1 | 5/2018 | DeBates et al. |
| 2018/0144232 A1 | 5/2018 | DeBates et al. |

FOREIGN PATENT DOCUMENTS

| | | |
|---|---|---|
| JP | 2006149423 | 6/2006 |
| KR | 20050072184 | 7/2005 |
| KR | 20050015685 | 2/2007 |
| KR | 20130020375 | 2/2013 |

OTHER PUBLICATIONS

"Final Office Action", U.S. Appl. No. 15/360,940, dated May 7, 2018, 13 pages.

"Foreign Office Action", KR Application No. 2017-0156565, dated Sep. 27, 2018, 14 pages.

"Non-Final Office Action", U.S. Appl. No. 15/360,909, dated Sep. 20, 2018, 8 pages.

"Non-Final Office Action", U.S. Appl. No. 15/360,940, dated Dec. 14, 2017, 12 pages.

"Notice of Allowance", U.S. Appl. No. 15/360,909, dated Nov. 15, 2018, 9 pages.

\* cited by examiner

RFID TAGS IN WEARABLES

CLAIM OF PRIORITY

This application is a continuation of and claims priority to U.S. patent application Ser. No. 15/360,909, filed Nov. 23, 2016, entitled "RFID Tags in Wearables", the entire disclosure of which is hereby incorporated by reference herein in its entirety.

BACKGROUND

Radio Frequency Identification (RFID) tags have been used, in the past, in connection with clothing in order to perform inventory control and track movement of the clothing through distribution channels. However, as the technology progresses, challenges continue to be presented to those who design and employ RFID tags.

BRIEF DESCRIPTION OF THE DRAWINGS

Embodiments of RFID tags in wearables are described with reference to the following Figures. The same numbers may be used throughout to reference like features and components that are shown in the Figures.

DETAILED DESCRIPTION

Figure 1:
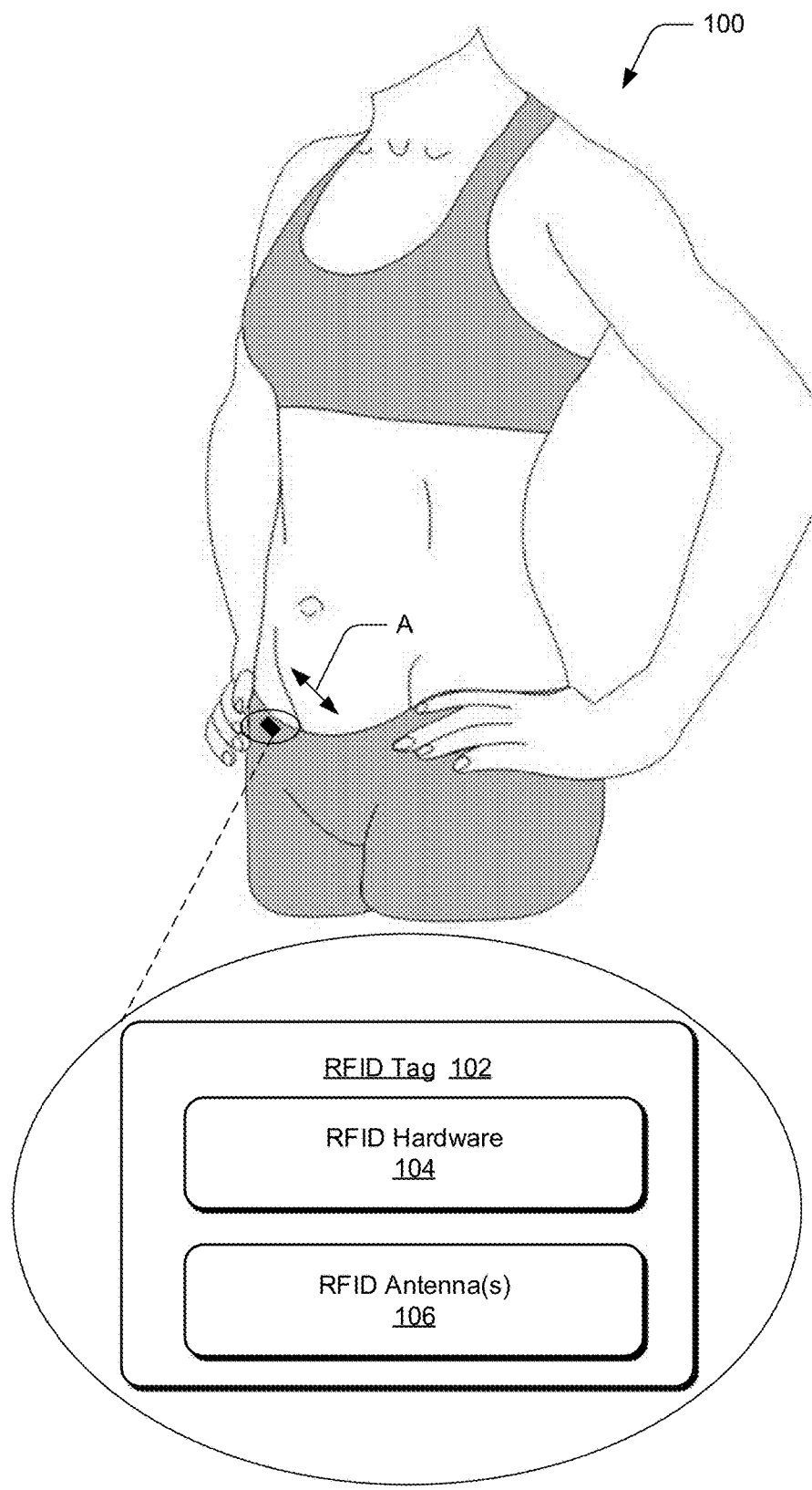
FIG. 1 illustrates an operating environment in which embodiments of wearables having RFID tags can be implemented.

Embodiments of RFID tags in wearable textile articles are described. A wearable textile article, such as a piece of clothing, for example, can include a RFID tag that is implemented to share information about or associated with a manufacturer, about or associated with the wearable textile article itself, and/or about or associated with a wearer of the wearable textile article.

In at least some embodiments, the wearable textile article comprises a stretchable textile or fabric, although such need not be the case. Different types of stretchable textiles exist including two-way stretch fabrics which stretch in one direction and four-way stretch fabrics which stretch in both directions—crosswise and lengthwise. Stretchable textiles or fabrics come in a wide variety of types including, by way of example and not limitation, spandex, vinyl, velvet, denim, cotton, wool, polyester, and the like. These types of stretchable textiles or fabrics can be used in a wide variety of so-called "wearables" such as clothing, hats, headbands, wristbands, socks, footwear, handwear, shorts, undergarments and the like, to name just a few. In at least some embodiments, a wearable includes at least one RFID tag mounted thereon. The RFID tag includes a stretch-activated switch having first and second modes. Each mode of the stretch-activated switch is associated with an RFID tag state—such as a first and second state, respectively.

The first mode corresponds to one of a stretched mode or an un-stretched mode, while the second mode corresponds to the other of the stretched mode or un-stretched mode. The stretched mode refers to a mode in which the wearable is stretched. The un-stretched mode corresponds to a mode in which the wearable is not stretched.

In some embodiments, the first state corresponds to one of an activated state or an un-activated state and the second state corresponds to the other of the activated state or un-activated state. The activated state corresponds to a state in which the RFID tag is operational for its intended purpose. Such intended purpose can include, by way of example and not limitation collecting data, receiving transmitted data, and/or transmitting data. The un-activated state corresponds to a state in which the RFID tag is less or differently operational than when in the activated state.

In at least some embodiments, a wearable includes at least one RFID tag. The RFID tag includes a contact-activated switch having first and second modes. The contact-activated switch enables automatic selection of at least one of the first or second modes without requiring a user to physically toggle a dedicated hardware on/off switch. Each mode of the contact-activated switch is associated with an RFID tag state—such as a first and second state, respectively.

The first mode corresponds to one of a contact mode or a non-contact mode, while the second mode corresponds to the other of the contact mode or non-contact mode. The contact mode refers to a mode in which the RFID tag is in contact with a user. The non-contact mode corresponds to a mode in which the wearable is not in contact with the user.

In some embodiments, the first state corresponds to one of a first operational state or a second different operational state and the second state corresponds to the other of the first operational state or the second different operational state. In at least some embodiments, the first operational state is associated with the RFID tag transmitting a first set of data and the second different operational state is associated with the RFID tag transmitting a second different set of data. Examples of sets of data include, by way of example and not limitation, manufacturing data such as that which can enable inventory control, wearable-specific data, wearable-specific data that can enable wearable handling such as that used by smart wearable-processing devices such as cleaning machines like washers and dryers, user specific data, user-specific physical data collected about the physical user by one or more sensors on the RFID tag, and the like.

In various embodiments, an RFID reader can be used to interrogate a RFID tag on a wearable textile article, and receive a response from the RFID tag.

In some embodiments, a cleaning machine automatically identifies cleaning instructions associated with a load of wearable textile articles using an RFID reader. That is, at least some of the wearable textile articles in the load include a respective RFID tag that provides information to the cleaning machine. The information can include information about the wearable textile article, handling instructions and the like. In turn, the cleaning machine can configure various cleaning settings based upon the information. Some embodiments identify incompatibilities between the various cleaning settings and the various wearable textile articles, and provide a notification of this incompatibility for a user. When the various cleaning settings are compatible, some embodiments automatically start a cleaning cycle.

While features and concepts of an RFID in wearables can be implemented in any number of different devices, systems, environments, and/or configurations, embodiments of the RFID in wearables are described in the context of the following example devices, systems, and methods.

Example Operating Environment

FIG. 1 illustrates an example operating environment generally at 100. In this example, the operating environment includes an individual wearing a wearable textile article in the form of a stretchable workout outfit. The stretchable workout outfit includes an RFID tag 102 fixed or otherwise mounted to waistband of the stretchable workout outfit. The waistband is stretchable in the direction of arrow A. The RFID tag 102 includes RFID hardware 104 and one or more RFID antennas 106. The RFID hardware and antenna(s) operate as described below.

The RFID tag 102 also includes a stretch-activated switch having first and second modes. Each mode of the stretch-activated switch is associated with an RFID tag state. For example, the first mode of the stretch-activated switch corresponds to a first state, while the second mode of the stretch-activated switch corresponds to a second different state. In the illustrated and described embodiment, the first mode corresponds to one of a stretched mode or an un-stretched mode. The second mode corresponds to the other of the stretched mode or un-stretched mode. The stretched mode refers to a mode in which the wearable is stretched. So, in this example, the stretched mode would correspond to the wearable textile article being worn by the individual. The un-stretched mode would correspond to the wearable textile article not being worn by the individual.

In operation, the RFID tag 102 can assume an activated state or an un-activated state. In the activated state, the RFID tag 102 is operational and can perform operations including, by way of example and not limitation, collecting data, receiving transmitted data, and/or transmitting data. In the un-activated state, the RFID tag 102 is less or differently operational than when in the activated state. In some instances, the un-activated state can correspond to when the RFID tag 102 is not operational. In some embodiments, the first state (corresponding to the first mode of the stretch-activated switch) corresponds to one of the activated state or the un-activated state. The second state (corresponding to the second mode of the stretch-activated switch) corresponds to the other of the activated state or un-activated state.

Having considered an example operating environment, consider now an RFID tag in accordance with one or more embodiments.

Example RFID Tag

Figure 2:
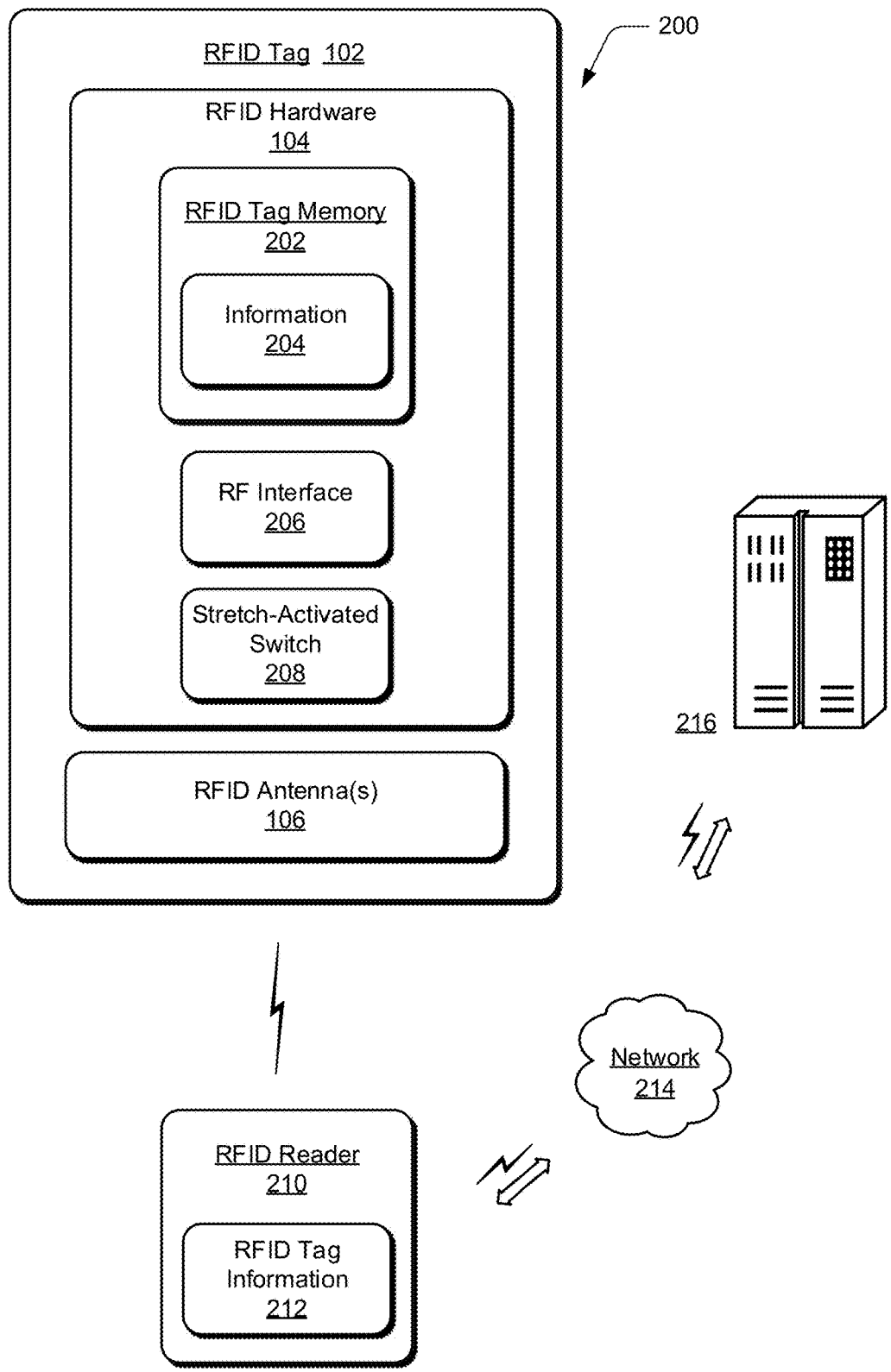
FIG. 2 illustrates a system including an RFID tag and RFID reader in accordance with one or more embodiments.

FIG. 2 illustrates an example system 200 that includes RFID tag 102. The RFID tag 102 includes RFID hardware 104 and one or more RFID antenna 106. The RFID hardware 104 includes RFID tag memory 202 that stores various information 204, an RF interface 206, and a stretch-activated switch 208 that operates as described above and below. System 200 also includes an RFID reader 210 that maintains RFID tag information 212.

In this example, RFID tag 102 is implemented to store, in RFID tag memory 202, information that can include, by way of example and not limitation, sets of data such as manufacturing data that can enable inventory control, wearable-specific data, wearable-specific data that can enable wearable handling such as that used by smart wearable-processing devices such as washers and dryers, user specific data, user-specific physical data collected about the physical user by one or more sensors on the RFID tag 102, and the like.

Examples of manufacturing data that can enable inventory control include, by way of example and not limitation, lot number, manufacturer ID, origination location, current location, intended destination and the like. Wearable-specific data can include size, color, manufacturer website, promotional information, information associated with how to replace the wearable or components of the wearable such as buttons and the like. Wearable-specific data that can enable wearable handling can include, by way of example and not limitation, handling instructions, washing instructions, material type, drying instructions, and the like. User specific data can include such things as user location, how many times a wearable has been worn, when a wearable has been worn, and various other parameters associated with the environment of the user. User-specific physical data collected about the physical user by one or more sensors can include various physiological information associated with the user such as, by way of example not limitation, pulse rate, temperature, activity tracking data such as exercise, and the like.

The RFID tag 102 is also implemented for two-way wireless communication with RFID readers, such as the RFID reader 210 (also referred to as a RFID interrogator) that interrogates the RFID tag 102 for various information 204 that is stored in the RFID tag memory 202. Generally, RFID tags are small electronic tags or labels that can be programmed with data and other information. The RFID reader 210 can transmit an interrogation signal as a broadcast message requesting RFID tags that are in range to return the data and information that the RFID tags have stored. The RFID tags can then wirelessly communicate the data and information to the RFID reader via a radio frequency (RF) communication channel, which the RFID reader 210 receives as the RFID tag information 212.

In implementations, RFID tag 102 can include an ASIC/CPU module and a transmitter and receiver (or transceiver) for two-way communication with the RFID reader 210. In response to receipt of an interrogation signal, the ASIC/CPU module of the RFID tag 102 formulates a response that may include data from the RFID tag, and the response is wirelessly transmitted to the RFID reader. The response signals from RFID tag 102 can be communicated using low frequency (LF), high frequency (HF), or ultra-high frequency (UHF) radio waves. The RFID tag data can be stored in non-volatile memory, and the ASIC/CPU module can be implemented as fixed or programmable logic for processing the RFID tag data, as well as modulating and demodulating the RF signals.

In implementations, the RFID tag memory 202 (e.g., non-volatile memory) can be accessed by the RFID reader 210 via a radio frequency (RF) interface 206 of the RFID tag 102.

The example system 200 also includes a network 214 that generally represents any type of communication and data network, and one or more servers 216 that can communicate via the network 214 (or combination of networks), such as for data communication between the RFID reader 210 and the server 216. The network 214 can be implemented to include wired and/or wireless networks. The network can also be implemented using any type of network topology and/or communication protocol, and can be represented or otherwise implemented as a combination of two or more networks, to include cellular networks, IP-based networks, and/or the Internet. The network 214 may also include mobile operator networks that are managed by a network provider of a cellular network, a mobile network operator, and/or other network operators, such as a communication service provider, mobile phone provider, and/or Internet service provider.

In at least some embodiments, information read by RFID reader 210 from RFID tag 102 can be utilized to communicate with server 216 by way of network 214. For example, in some instances information read from RFID tag 102 may include a website associated with a wearable textile article. For example, the website may be that of the manufacturer of the wearable textile article and may include information associated with other wearable textile articles that may be purchased by the wearer. In this instance, the RFID reader 210 may comprise part of a computing device, such as a handheld device, e.g., a smart phone, that has an application that can access the website. Further, information read by RFID reader 210 from RFID tag 102 may be used to verify the authenticity of the RFID tag and associated wearable textile article. For example, RFID reader 210 may interrogate RFID tag 102 to receive encrypted information that can be used to authenticate or verify the authenticity of RFID tag 102. This can be done through communication with server 216 by way of network 214.

Having considered an example RFID tag and system, consider now an example stretch-activated switch in accordance with one or more embodiments.

Example Stretch-Activated Switch

Figure 3:
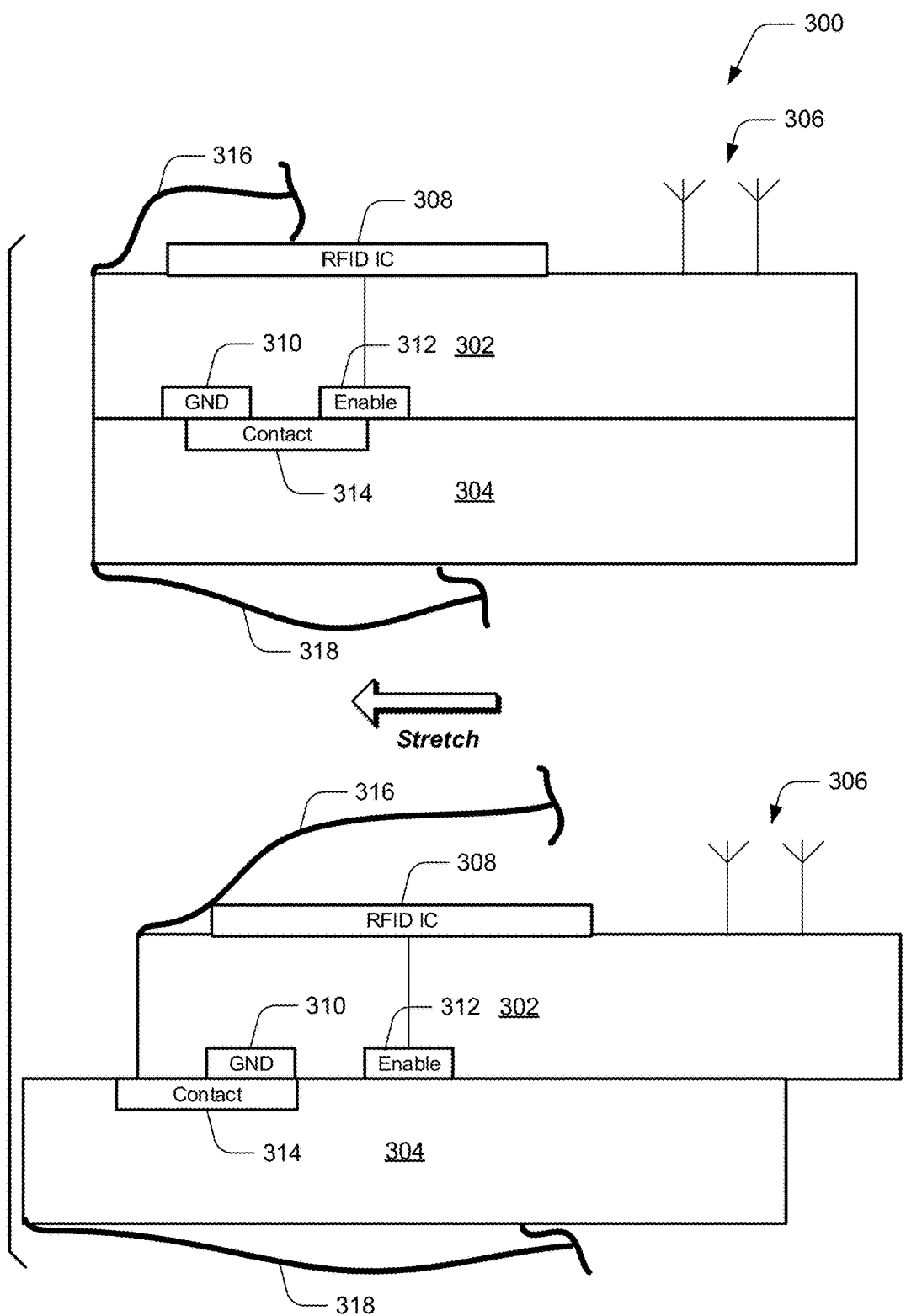
FIG. 3 illustrates an example stretch-activated switch in an RFID tag in accordance with one or more embodiments.

FIG. 3 illustrates an example stretch-activated switch included as part of a system, generally at 300. The uppermost illustration depicts the system 300 in which the stretch-activated switch is in a first mode, while the bottommost illustration depicts the system with the stretch-activated switch in a second mode. In the illustrated and described embodiment, the stretch-activated switch is included as part of a first layer 302 and a second layer 304. The first and second layers 302, 304 are slidable relative to one another to help facilitate operation of the switch.

The first layer 302 includes one or more antennas 306 and RFID integrated circuitry 308 (e.g., hardware to implement RFID operations). The RFID integrated circuitry 308 corresponds to components including RFID tag memory 202, RF interface 206 and other componentry of RFID tag 102 (FIG. 2). The first layer 302 also includes a ground contact 310 and an RFID enable contact 312 which form part of the stretch-activated switch.

Second layer 304 includes a contact 314 which also forms part of the stretch-activated switch. Each layer 302, 304 is mounted to or otherwise affixed to a stretchable, wearable textile article. In this particular example, first layer 302 is connected to a stretchable portion 316 and second layer 304 is connected to a stretchable portion 318. In the first mode, the wearable textile article is un-stretched. This corresponds to a situation where the wearable textile article is not being worn by a user. When the wearable textile article is un-stretched, contact 314 spans across ground contact 310 and RFID enable contact 312. In this manner, the RFID enable contact 312 is grounded to the ground contact 310 by way of contact 314. When the RFID enable contact 312 is grounded, the RFID integrated circuitry 308 and hence, the RFID tag is in an un-activated state.

The bottommost depiction illustrates the stretch-activated switch in the second mode. In this mode, the stretch-activated switch is stretched, as by a user who has donned the wearable textile article. When the wearable textile article is donned, stretchable portion 316 pulls first layer 302 to the right, and stretchable portion 318 pulls the second layer 304 to the left. This causes contact 314 to slidably disengage the RFID enable contact 312, and thus enable the activated state of the RFID integrated circuitry 308 and hence, the RFID tag. When activated, the RFID tag is operational for its intended purpose. Such intended purpose can include, by way of example and not limitation, collecting data, receiving transmitted data, and/or transmitting data as by being interrogated by an RFID reader.

Having considered an example stretch-activated switch in accordance with one or more embodiments, consider the following method or methods in accordance with one or more embodiments.

Example method 400 is described with reference to FIG. 4 in accordance with implementations of the stretch-activated switch of an RFID tag mounted on a stretchable, wearable textile article. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
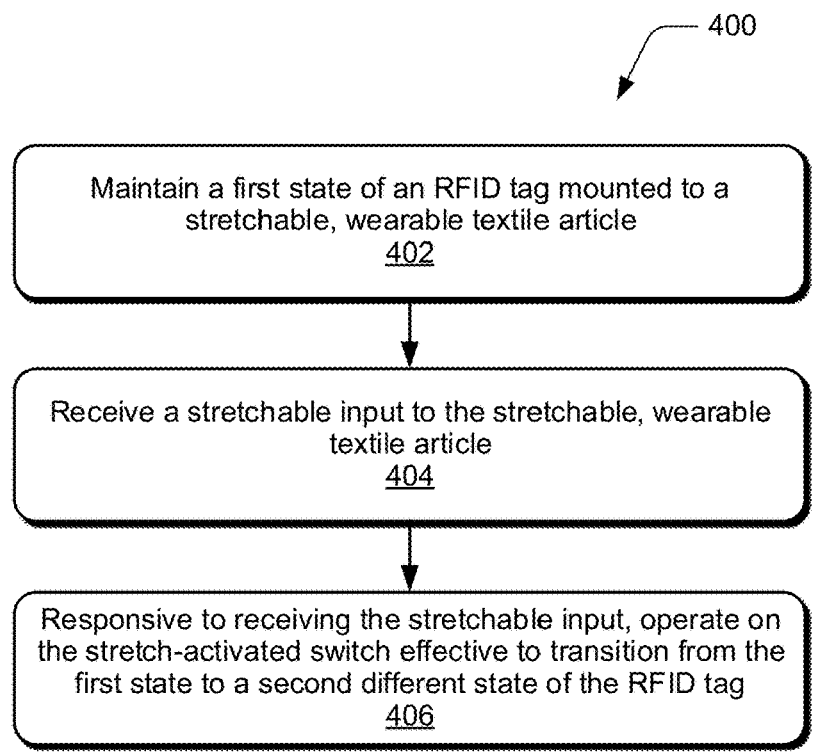
FIG. 4 illustrates an example method in accordance with one or more embodiments.

FIG. 4 illustrates example method 400 of a stretch-activated switch of an RFID tag mounted on a stretchable, wearable textile article as described herein. The order in which the method is described is not intended to be construed as a limitation, and any number or combination of the described method operations can be performed in any order to perform a method, or an alternate method.

At 402, a first state of an RFID tag mounted to a stretchable, wearable textile article is maintained. The RFID tag includes a stretch-activated switch that is stretchable to activate or un-activate the RFID tag. For example, the first state can be an un-activated state as described above. Alternately, the first state can be an activated state as described above.

At 404, a stretchable input to the stretchable, wearable textile article is received. The stretchable input can include an input that stretches the stretchable, wearable textile article. Alternately, the stretchable input can include an input that un-stretches the stretchable, wearable textile article.

At 406, the stretch-activated switch is operated on, responsive to receiving the stretchable input, effective to transition from the first state to a second different state of the RFID tag. In at least some embodiments, the second different state can be an activated state, when the first state is an un-activated state. Alternately, the second different state can be an un-activated state, when the first state is an activated state.

The above-described embodiments improve the state of the art by automatically activating or un-activating an RFID tag that is mounted on a stretchable, wearable textile article. This relieves the user of having to physically, manually manipulate an on/off switch to activate the RFID tag. So, for example, in at least some embodiments when a user dons the stretchable, wearable textile article, the RFID tag can be automatically activated without requiring any action from a user other than donning the stretchable, wearable textile article. In this manner, the user's experience is improved because the user no longer needs to remember to turn on the RFID tag.

Having considered an example stretch-activated switch, consider now an example RFID tag with a contact-activated switch in accordance with one or more embodiments.

Example RFID Tag with a Contact-Activated Switch

Figure 5:
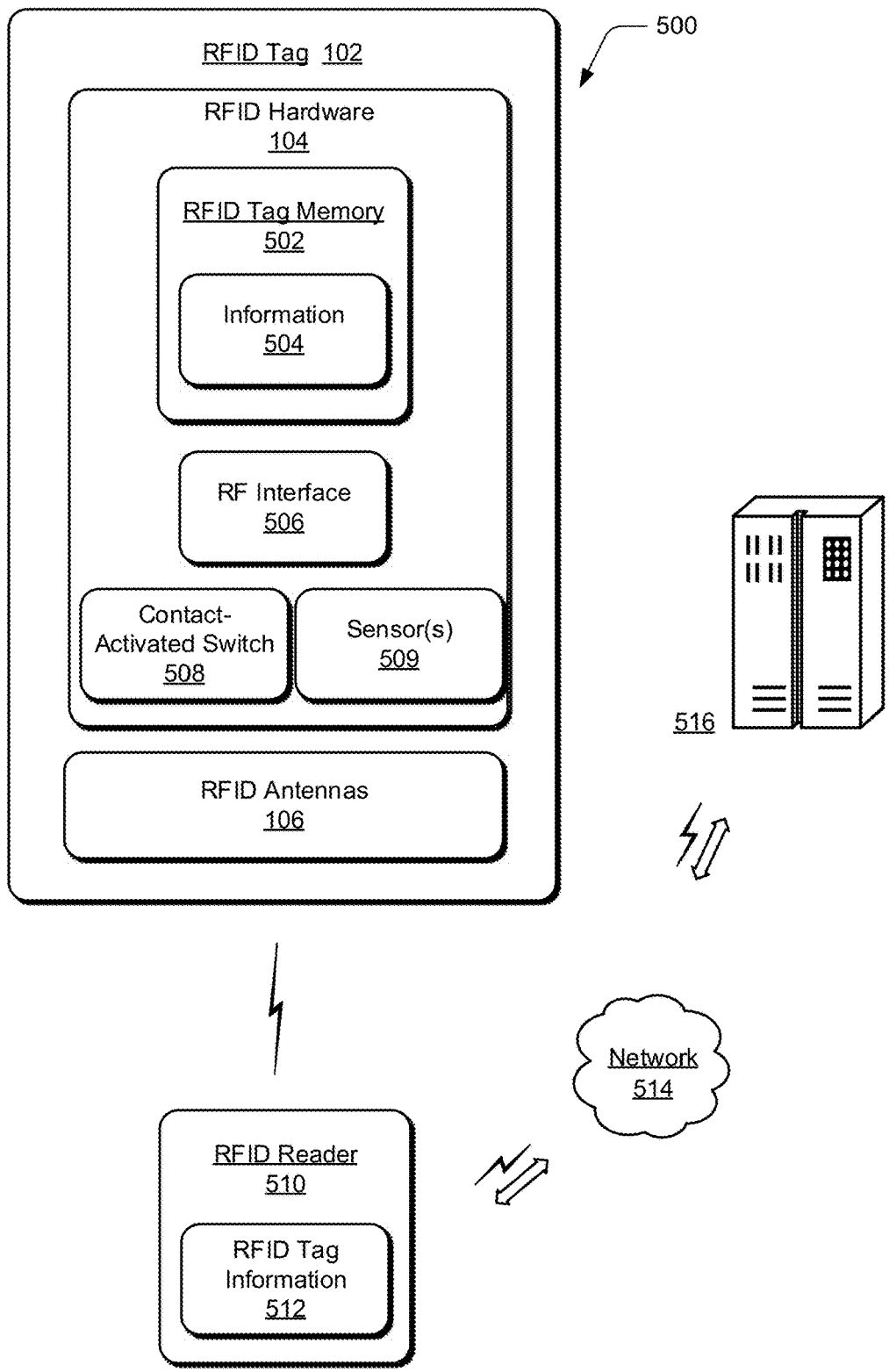
FIG. 5 illustrates a system including an RFID tag and RFID reader in accordance with one or more embodiments.

FIG. 5 illustrates an example system 500 that includes RFID tag 102. The RFID tag 102 includes RFID hardware 104 and two RFID antennas 106. The RFID hardware 104 includes RFID tag memory 502 that stores various information 504, an RF interface 506, a contact-activated switch 508 that operates as described above and below, and optionally one or more sensors 509. System 500 also includes an RFID reader 510 that maintains RFID tag information 512.

In this example, RFID tag 102 is implemented to store, in RFID tag memory 502, information that can include, by way of example and not limitation, sets of data such as manufacturing data that can enable inventory control, wearable-specific data, wearable-specific data that can enable wearable handling such as that used by smart wearable-processing devices such as washers and dryers, user specific data, user-specific physical data collected about the physical user by one or more sensors on the RFID tag 102, such as sensors 509.

Examples of manufacturing data that can enable inventory control include, by way of example and not limitation, lot number, manufacturer ID, origination location, current location, and the like. Wearable-specific data can include size, color, manufacturer website, promotional information, information associated with how to replace the wearable or components of the wearable such as buttons, how many times the wearable has been worn, and the like. Wearable-specific data that can enable wearable handling can include, by way of example and not limitation, handling instructions, washing instructions, material type, drying instructions, and the like. User specific data can include such things as user location and various other parameters associated with the environment of the user. User-specific physical data collected about the physical user by one or more sensors 509 can include various physiological information associated with the user such as, by way of example not limitation, pulse rate, temperature, and the like.

The RFID tag 102 is also implemented for two-way wireless communication with RFID readers, such as the RFID reader 510 (also referred to as a RFID interrogator) that interrogates the RFID tag 102 for various information 504 that is stored in the RFID tag memory 502. The RFID reader 510 can transmit an interrogation signal as a broadcast message requesting RFID tags that are in range to return the data and information that the RFID tags have stored. The RFID tags can then wirelessly communicate the data and information to the RFID reader via a radio frequency (RF) communication channel, which the RFID reader 510 receives as the RFID tag information 512.

In implementations, RFID tag 102 can include an ASIC/CPU module and a transmitter and receiver (or transceiver) for two-way communication with the RFID reader 510. In response to receipt of an interrogation signal, the ASIC/CPU module of the RFID tag 102 formulates a response that may include data from the RFID tag, and the response is wirelessly transmitted to the RFID reader. The response signals from RFID tag 102 can be communicated using low frequency (LF), high frequency (HF), or ultra-high frequency (UHF) radio waves. The RFID tag data can be stored in non-volatile memory, and the ASIC/CPU module can be implemented as fixed or programmable logic for processing the RFID tag data, as well as modulating and demodulating the RF signals.

In implementations, the RFID tag memory 502 (e.g., non-volatile memory) can be accessed by the RFID reader 510 via a radio frequency (RF) interface 506 of the RFID tag 102.

The example system 500 includes a network 514 that generally represents any type of communication and data network, and one or more servers 516 that can communicate via the network 514 (or combination of networks), such as for data communication between the RFID reader 510 and the server 516. The network 514 can be implemented to include wired and/or wireless networks. The network can also be implemented using any type of network topology and/or communication protocol, and can be represented or otherwise implemented as a combination of two or more networks, to include cellular networks, IP-based networks, and/or the Internet. The network 514 may also include mobile operator networks that are managed by a network provider of a cellular network, a mobile network operator, and/or other network operators, such as a communication service provider, mobile phone provider, and/or Internet service provider.

In at least some embodiments, information read by RFID reader 510 from RFID tag 102 can be utilized to communicate with server 516 by way of network 514. For example, in some instances information read from RFID tag 102 may include a website associated with a wearable textile article. For example, the website may be that of the manufacturer of the wearable textile article and may include information associated with other wearable textile articles that may be purchased by the wearer. In this instance, the RFID reader 510 may comprise part of the computing device that has an application that can access the website. Further, information read by RFID reader 510 from RFID tag 102 may be used to verify the authenticity of the RFID tag and associated wearable textile article. For example, RFID reader 510 may interrogate RFID tag 102 to receive encrypted information that can be used to authenticate or verify the authenticity of RFID tag 102. This can be done through communication with server 516 by way of network 514.

In at least some embodiments, the contact-activated switch 508 has first and second modes. The contact-activated switch enables automatic selection of at least one of the first or second modes without requiring a user to physically toggle a dedicated hardware on/off switch. Each mode of the contact-activated switch is associated with an RFID tag state—such as a first and second state, respectively.

The first mode corresponds to one of a contact mode or a non-contact mode, while the second mode corresponds to the other of the contact mode or non-contact mode. The contact mode refers to a mode in which the contact-activated switch is in contact with a user. The non-contact mode corresponds to a mode in which the contact-activated switch is not in contact with the user.

In some embodiments, the first state corresponds to one of a first operational state or a second different operational state and the second state corresponds to the other of the first operational state or the second different operational state. In at least some embodiments, the first operational state is associated with the RFID tag transmitting a first set of data and the second different operational state is associated with the RFID tag transmitting a second different set of data. Examples of sets of data include, by way of example and not limitation and as noted above, manufacturing data such as that which can enable inventory control, wearable-specific data, wearable-specific data that can enable wearable handling such as that used by smart wearable-processing devices such as washers and dryers, user specific data, user-specific physical data collected about the physical user by one or more sensors on the RFID tag, and the like. The first and second sets of data can include any combination of these data, as well as other data.

Having considered an example RFID tag and contact-activated switch, consider now an example contact-activated switch in accordance with one or more embodiments.

Figure 6:
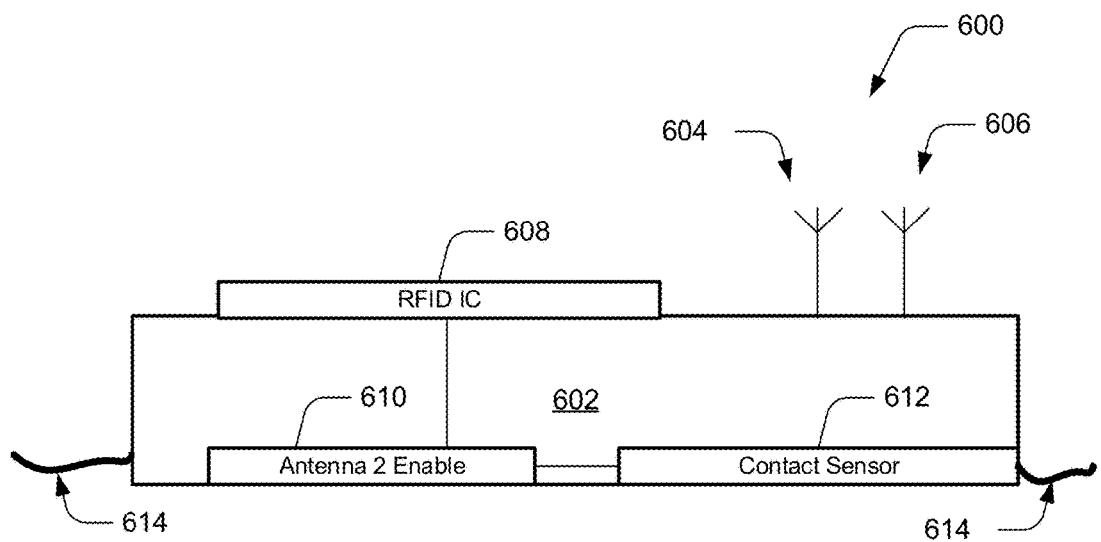
FIG. 6 illustrates a contact-activated switch in an RFID tag in accordance with one or more embodiments.

FIG. 6 illustrates an example contact-activated switch included as part of a system, generally at 600. In the illustrated and described embodiment, the contact-activated switch is included as part of a layer 602. The layer 602 can be configured as part of a tag that is typically affixed to a wearable textile article, indicated here by tag portions 614. Examples of such tags include tags that are sewn to the inside of a piece of clothing, such as a shirt, dress, socks, wristband, and the like. Such a tag might be sewn on the inside of the wearable, such as in the neck region or wasteband.

The layer 602 includes two antennas 604, 606 and RFID integrated circuitry 608. The RFID integrated circuitry 608 (e.g., hardware to implement RFID operations) corresponds to components including RFID tag memory 502, RF interface 506 and other componentry of RFID tag 102 (FIG. 5). The layer 602 also includes an antenna enable contact 610 and a contact sensor 612. Contact sensor 612 can include any sensor that can detect contact with a wearer of the wearable textile article. The contact sensor can be configured to sense contact directly, such as through physical contact with a wearer's skin. Alternately or additionally, the contact sensor can be configured to sense contact indirectly by way of an environmental change associated with the ambient environment on or around the contact sensor 612. Accordingly, contact sensor 612 can include, by way of example and not limitation, temperature sensors, capacitance sensors, sensors that sense moisture such as sweat, resistance sensors, and the like. So, for example, if a wearer dons the wearable textile article, a contact sensor in the form of a temperature sensor would invariably sense an increase in the ambient temperature adjacent the sensor.

In the illustrated and described embodiment, the antennas are illustrated as being associated with a single RFID tag. In other embodiments, each antenna is associated with a different RFID tag and the contact-activated switch enables switching between the different RFID tags to permit the transmission of first and second respective sets of data, as described below.

In operation, in this specific example, the contact-activated switch has a first and second mode. The contact-activated switch enables automatic selection of a mode or modes without requiring a user to physically toggle a dedicated hardware on/off switch. Each mode of the contact-activated switch is associated with an RFID tag state—such as a first and second state, respectively.

In this specific example, the first mode corresponds to a non-contact mode, while the second mode corresponds to a contact mode. The non-contact mode corresponds to a mode in which the wearable is not in contact with the user. In this instance, the user is not in contact with contact sensor 612. The contact mode refers to a mode in which the wearable is in contact with a user. In this instance, the user is in contact with contact sensor 612 or at least in proximity enough that the contact sensor can sense a change in its ambient environment.

In some embodiments, the first state corresponds to a first operational state and the second state corresponds to a second different operational state. In this example, the first operational state (corresponding to the non-contact mode) is associated with the RFID tag transmitting a first set of data by way of antenna 604. When the RFID tag transmits data by way of antenna 604, antenna 606 is disabled. The second operational state (corresponding to the contact mode) is associated with the RFID tag transmitting a second different set of data by way of antenna 606. That is, when a user comes in contact with contact sensor 612, the contact sensor enables antenna 606 by way of the antenna enable contact 610. When antenna 606 is enabled, antenna 604 is disabled.

Examples of sets of data include, by way of example and not limitation, manufacturing data such as that which can enable inventory control, wearable-specific data, wearable-specific data that can enable wearable handling such as that used by smart wearable-processing devices such as washers and dryers, user specific data, user-specific physical data collected about the physical user by one or more sensors on the RFID tag, and the like.

So, for example, when the contact-activated switch is in the first mode, the user is not in contact with contact sensor 612. In this case, antenna 604 may transmit manufacturing data only or wearable-specific data that can be used for wearable handling. If, on the other hand, the user is in contact with contact sensor 612, antenna 604 is disabled and antenna 606 is enabled. When antenna 606 is enabled, antenna 606 may transmit sensor data ascertained from sensor(s) 509 (FIG. 5), such as user-specific data or user-specific physical data collected by the sensor(s) 509.

Having considered an example contact-activated switch in accordance with one or more embodiments, consider the following method or methods in accordance with one or more embodiments.

Example method 700 is described with reference to respective FIG. 7 in accordance with implementations of the contact-activated switch of an RFID tag mounted on a wearable textile article, which may or may not be a stretchable textile article. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
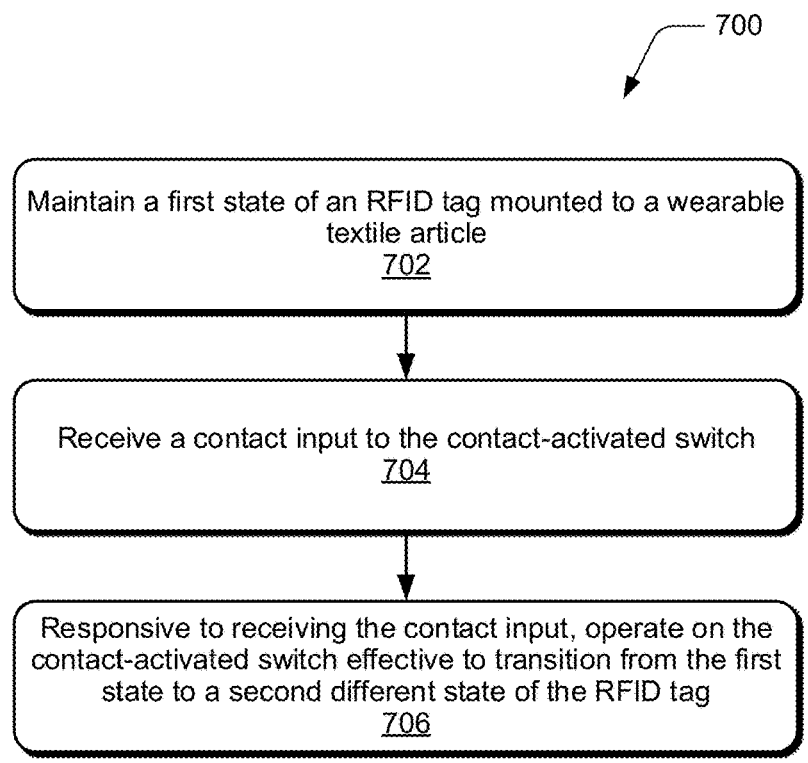
FIG. 7 illustrates an example method in accordance with one or more embodiments.

FIG. 7 illustrates example method 700 of a contact-activated switch of an RFID tag mounted on a wearable textile article as described herein. The order in which the method is described is not intended to be construed as a limitation, and any number or combination of the described method operations can be performed in any order to perform a method, or an alternate method.

At 702, a first state of an RFID tag mounted to a wearable textile article is maintained. The RFID tag includes a contact-activated switch that can enable and disable individual antennas of an antenna pair on the RFID tag. For example, the first state can be a state in which a first antenna is enabled to transmit a first set of data, while a second antenna is disabled so as not to transmit a second different set of data. Examples of first and second sets of data are given above.

At 704, a contact input to the contact-activated switch is received. The contact input can include an input that physically contacts the contact-activated switch. Alternately, the contact input can include input in which a user's body is in near enough proximity to the contact-activated switch to change the ambient environment. For example, the user may put on a shirt that has the RFID tag embedded in the tag of the shirt. The tag may be adjacent the user's back and in close enough proximity to raise the ambient temperature adjacent the tag.

At 706, the contact-activated switch is operated on, responsive to receiving the contact input, effective to transition from the first state to a second different state of the RFID tag. In at least some embodiments, the second different state can be a state in which the first antenna is disabled, while the second antenna is enabled so as to transmit the second different set of data.

The above-described embodiments improve the state of the art by automatically enabling and disabling RFID antennas so as to transmit different sets of data based on whether or not a user is wearing a wearable textile article. This relieves the user of having to physically, manually manipulate any input mechanisms of the RFID tag. So, for example, in at least some embodiments when a user dons the wearable textile article, an antenna can be automatically enabled to allow the RFID tag to transmit a corresponding set of data without requiring any action from a user other than donning the wearable textile article. In this manner, the user's experience is improved because the user does not need to be proactively involved in manipulating the RFID tag.

Having considered embodiments that employ a contact-activated switch, consider now a system that employs an RFID tag to implement so-called smart textile cleaning.

Smart Textile Cleaning

As described herein, the data stored in an RFID tag, whether collected in real time or programmed, can be read by an RFID reader as a way to exchange information. For instance, when a user wears a wearable textile article that includes an RFID tag, real time data can be collected about how the user interacts or uses the wearable textile article. An RFID reader can then be used to extract information from the RFID tag, and then forward the extracted information to an interested recipient, such as a manufacturer of the wearable textile article. In turn, the manufacturer can analyze data collected in real time in order to learn information about the wearable textile article such as how well the article holds up, an environment in which the article is worn, and so forth, in order to discern potential areas of improvement. Alternatively, RFID tags affixed to wearable textile articles can include pre-programmed data that can be subsequently extracted and used by another device to learn information, such as handling instructions, washing instructions, and so forth. Accordingly, this information can be used by the device to automatically select cleaning settings for wearable textile articles, determine incompatibilities between textile articles and/or textile articles and settings of the device, or provide notifications to a user. For example, both wearable and non-wearable textile articles may include RFID tags with information about the articles. So, if a user places a red towel and a white dress shirt into a smart washer, the smart washer can ascertain from the RFID tags on each article that the articles are incompatible and can issue a notification warning to the user. Alternately or additionally, if a user places a delicate textile article in a washing machine that has a wash cycle set to "hot", this incompatibility can be detected and a notification can be issued or more appropriate settings can be automatically selected.

Figure 8:
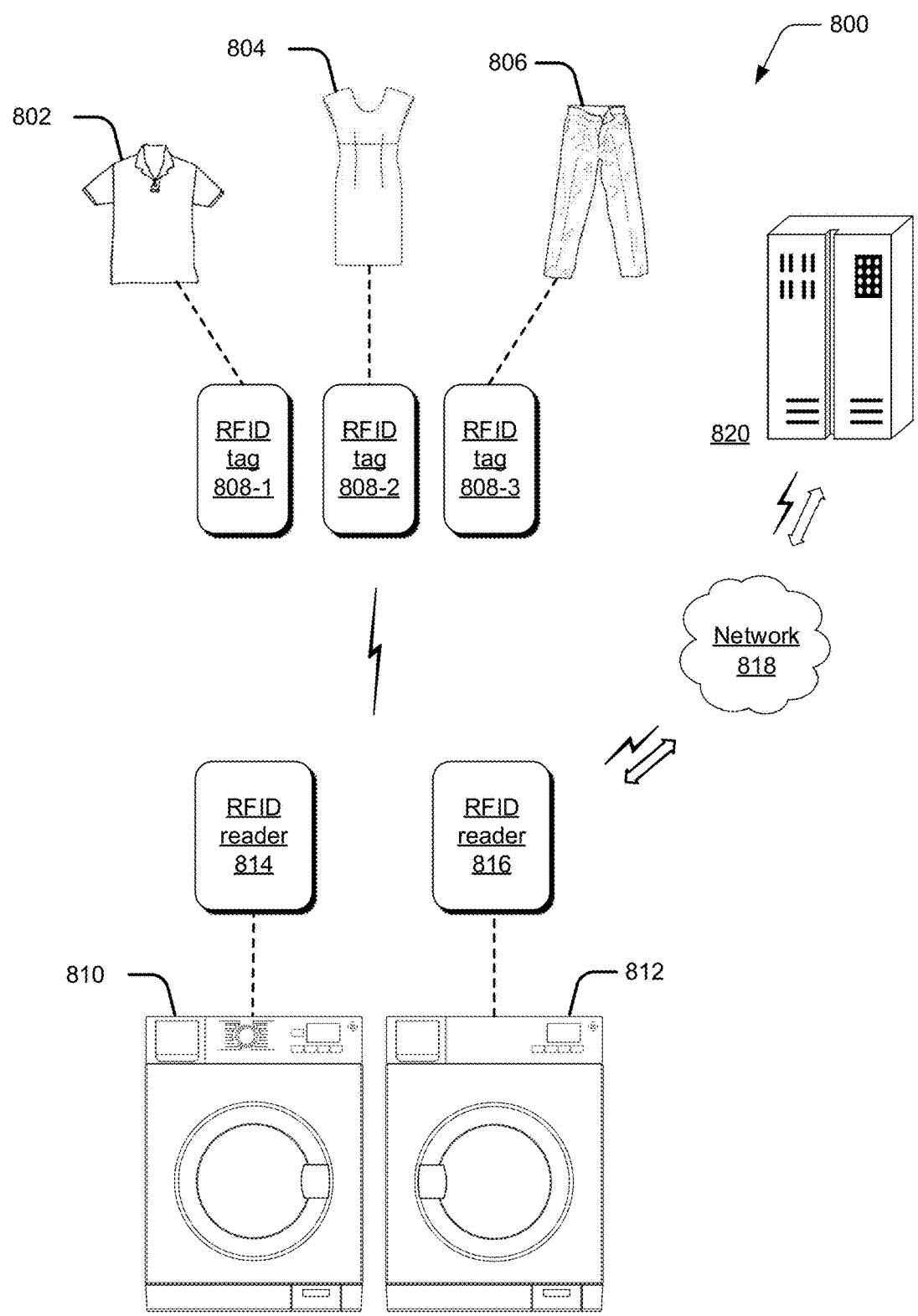
FIG. 8 illustrates a system including an RFID tag and RFID reader in accordance with one or more embodiments.

FIG. 8 illustrates environment 800 in which an RFID tag and RFID reader can be employed in connection with both wearable textile articles and non-wearable textile articles. Among other things, environment 800 includes various wearable textile articles, such as shirt 802, dress 804, and jeans 806. Each wearable textile article includes a RFID tag mounted or attached to the clothing, labeled here as RFID tag 808-1, RFID tag 808-2, and RFID tag 808-3, respectively. The RFID tags can be implemented in any suitable manner, such as a RFID tag with a stretch-activated switch (e.g., RFID tag 102 of FIG. 1) or a RFID tag with contact-activated switch (e.g., RFID tag 102 of FIG. 5).

Environment 800 also includes cleaning machines in the form of a washing machine 810 and drying machine 812, which include RFID reader 814 and RFID reader 816, respectively. Here, washing machine 810 and drying machine 812 are illustrated as "smart devices" that can include additional capability not found in basic washing machines or drying machines, such as, by way of example and not limitation, connectivity to Wi-Fi, remote control from a secondary device (e.g., mobile phone, desktop PC), remote notifications to the secondary device, touch screen interfaces, display panels for displaying information such as notifications and warnings, and so forth. RFID reader 814 and RFID reader 816 are configured to wirelessly communicate with, or extract information from, an RFID tag, such as RFID tags 808-1, 808-2, and 808-3. Among other things, RFID readers 814 and 816 extract information as a way for washing machine 810 and drying machine 812 to determine cleaning settings or instructions for a load of clothing that can contain one wearable textile article, or multiple articles which may or may not be wearable. Here, cleaning settings or instructions can include washer settings, dryer settings, washing instructions, drying instructions, color information, size information, weight information, textile composition, and/or handling instructions. Accordingly, RFID readers 814 and 816 work in concert with their respective cleaning machine to provide smart clothes cleaning.

Environment 800 also includes a network 818 that generally represents any type of communication and data network, and one or more servers 820 that can communicate via the network 818 (or combination of networks), such as for data communication between the RFID readers 814 and 816 and the server 820. Alternately or additionally, washing machine 810 and/or drying machine 812 can communicate with remote devices over network 818, such as server 820, a remote mobile device, a remote desktop computer, etc. The network 818 can be implemented to include wired and/or wireless networks. The network can also be implemented using any type of network topology and/or communication protocol, and can be represented or otherwise implemented as a combination of two or more networks, to include cellular networks, IP-based networks, and/or the Internet. The network 818 may also include mobile operator networks that are managed by a network provider of a cellular network, a mobile network operator, and/or other network operators, such as a communication service provider, mobile phone provider, and/or Internet service provider.

In at least some embodiments, information read by RFID readers 814 and 816 from any combination of RFID tags 808-1 through 808-3 can be utilized to communicate with server 820 by way of network 818. For example, in some instances information read from RFID tags 808-1, 808-2, and 808-3 may include a website or address associated with a wearable textile article. The website may be associated with a manufacturer of the wearable textile article, and can provide access to information associated with the corresponding wearable textile article, such as cleaning information. In this instance, RFID reader 814 and RFID reader 816 can interface with washing machine 810 and drying machine 812, or an application executing on each machine, to gain access to the website, associated server, or address in order to exchange data. Further, information read by RFID reader 814 and RFID reader 816 from RFID tags 808-1, 808-2, and 808-3 may be used to verify the authenticity of the respective RFID tag and associated wearable textile article. For example, RFID readers 814 and 816 may interrogate an RFID tag to receive encrypted information that can be used to authenticate or verify the authenticity of that RFID tag. This can be done through communication with server 820 by way of network 818.

Consider now a user placing shirt 802, dress 804, and jeans 806 into washing machine 810 (or drying machine 812) at the same time to create a load of laundry. As each wearable textile article (and corresponding RFID tag) is placed within working range of RFID reader 814 (or RFID reader 816), information can be extracted from each RFID tag that is identified. Washing machine 810 can use this information to automatically select wash settings (e.g., hot water, cold water, warm water, heavy soil cycle, light soil cycle, hand wash cycle, bedding cycle, low spin, high spin, and so forth). In a similar manner, drying machine 812 can use this information to automatically select dry settings (e.g., drying duration time, drying temperature, wrinkle prevention, steam freshening, etc.). The information extracted from the respective RFID tags can include the specific wash settings, information about the clothing, and/or can include an address associated with a clothing manufacturer.

In some embodiments, washing machine 810 or drying machine 812 contacts a corresponding manufacture identified on an RFID tag to gather information about a corresponding wearable textile article. As part of gathering information, some embodiments forward characteristics associated with washing machine 810 or drying machine 812 to the manufacturer, such as model and make information. In turn, the manufacturer can use this information to identify and return washing instructions (or drying instructions) specific to that particular model and make, or return default cleaning settings or instructions that are independent of the model or make information. A manufacturer can also return characteristics about a corresponding wearable textile article that are then used by a cleaning machine to make decisions on how to launder the particular piece of clothing (e.g., material type, color, weight). Further, the manufacturer can automatically return information when contacted by a cleaning machine, or return data in response to a query.

Once information about the wearable (or non-wearable) textile article contained within a current load has been obtained, washing machine 810 and/or drying machine 812 can use this information to determine characteristics about the current load as a way to select cleaning settings for a wash cycle or dry cycle. However, as part of selecting cleaning settings, washing machine 810 or drying machine 812 can also perform a compatibility check on the identified articles contained within a load. The compatibility check can be performed as between articles in the load, and/or as between articles and settings of the washing or drying machine. When a load of clothing is determined to have compatible articles (e.g., compatible cleaning instructions or compatible article characteristics), washing machine 810 and/or drying machine 812 can automatically select the cleaning settings and can either automatically start a wash cycle or dry cycle, or wait for user input before starting a wash or dry cycle. However, when a load of clothing is determined to be incompatible (e.g., as by containing incompatible cleaning settings or instructions, or color/material mis-matches), the user may be notified and/or so that corrective action can be taken.

Returning to the above example, now consider a case where washing machine 810 determines that the load containing shirt 802, dress 804, and jeans 806 encompasses mixed articles of clothing with differing or incompatible washing instructions. For instance, shirt 802 may be identified as a white load with hot water and/or bleaching instructions, jeans 806 may be identified as a dark load with cold water instructions, and dress 804 is identified as dry-clean only or delicate cycle. In some embodiments, washing machine 810 provides the user with an update or indication that the load contains mixed clothing types, or that the load contains incompatible cleaning settings or instructions. Further, when a potential problem has been identified, a wash cycle (or dry cycle) can be halted, or prevented from automatically starting, until instructions are received from the user. For example, some embodiments may proceed with the cleaning process by selecting a default cleaning configuration that is considered safe for mixed loads with incompatible cleaning instructions (e.g., a cleaning configuration that will not damage the clothing). However, in such an instance, the user may be notified that default or safe settings have been selected. Other embodiments can halt the cleaning process entirely, notify the user, and wait for further input before proceeding.

Consider now a user creating a load of articles to wash by combining multiple white socks and white t-shirts with a red sock or a red towel. By using information gathered from corresponding RFID tags, washing machine 810 is able to identify a color incompatibility within the load, and notify the user that a potential problem exists. Since such a scenario has the potential of irreparable damage to the white articles of clothing by altering their color to pink, the cleaning process is halted. Any suitable type of notification can be sent to a user, such as a generic notification indicating "Incompatible Color Types" or "Incompatible Washing Types". Alternately, the notification can indicate specific information about the clothing items in the load, such as "Red Colored Sock Mixed with Whites" or "Dry-Clean Only Garment in Load". In a similar manner, drying machine 812 can identify when articles have mixed drying instructions (e.g., hot dry cycle mixed with air-dry only) and notify the user.

Notifications can be received in any suitable manner, such as through a display device or touchscreen interface of the washing machine, or can be communicated to a remote device or application that provides the updates to the user. For example, some smart devices enable a user to remotely start or stop operation of a device via an application running on a mobile device. Some embodiments of washing machine 810 and drying machine 812 can forward notifications to the application on the mobile device regarding identified problems or incompatibles. In addition to receiving notifications, a user can interface with an application on a mobile phone or a local display device to enter input regarding a problem that has been identified. Thus, a wash cycle or dry cycle can be halted, or prevented from automatically starting, until instructions are received from the user. In a similar manner, washing machine 810 and drying machine 812 can provide updates to a user, such as updates corresponding to the selected settings, or a state of the wash cycle (e.g., "Settings Selected", "Wash Cycle Started", "Rinse Cycle Started", "Washing Completed", "Enter Input to Continue", etc.).

Some embodiments share information between a washing machine and a drying machine. For example, after extracting or obtaining information about the articles contained within a load, the washing machine can communicate with the drying machine to share some or all of this information. Alternately or additionally, the washing machine can communicate information derived from the load to the drying machine (or to the user), such as expected time duration of the wash cycle or an expected completion time. In response to the communication, the drying machine can use the received information to predict or configure the drying settings. The drying machine can also notify the user of an expected time duration of the dry cycle, an expected time duration of the combined wash cycle and dry cycle, expected completion time for the dry cycle, an expected completion time of the combined wash cycle and dry cycle, etc. In some cases, the drying machine communicates its own information to the washing machine, such as dry cycle information derived from the information received from the washing machine, dry cycle information about a current dry cycle in progress, information about a current dry load, etc. In turn, the washing machine can adjust a current wash cycle, such as adjusting or optimizing the wash cycle to complete shortly after a current dry cycle ends. Information can be shared between the washing machine and the drying machine in any suitable manner, such as through a local wireless link, through wireless or wired communications routed through a server, a local wired link, etc.

Figure 9:
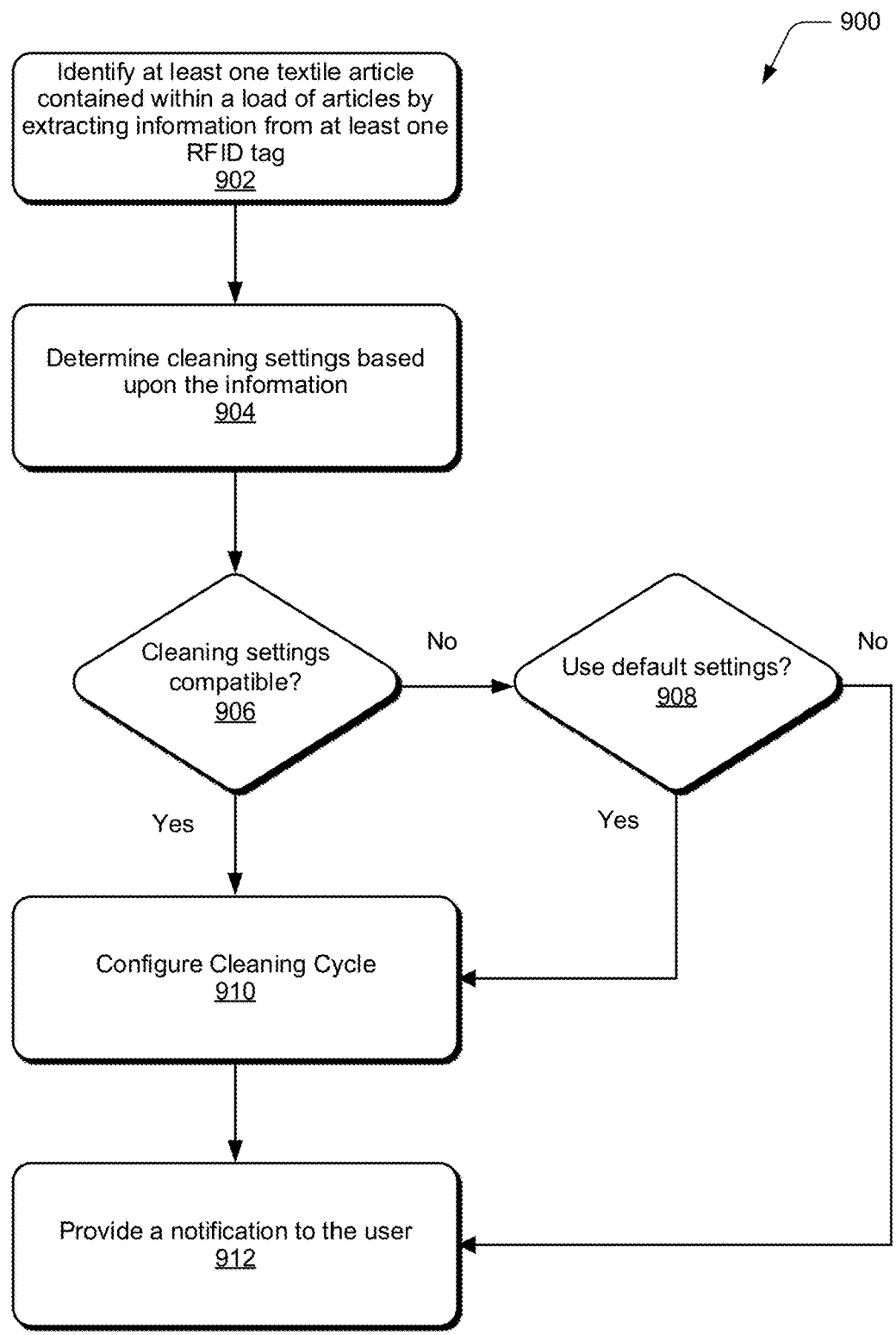
FIG. 9 illustrates an example method in accordance with one or more embodiments.

FIG. 9 illustrates example method 900 that automatically ascertains cleaning instructions for both wearable textile articles and non-wearable textile articles, as described herein. The order in which the method is described is not intended to be construed as a limitation, and any number or combination of the described method operations can be performed in any order to perform a method, or an alternate method. In some embodiments, method 900 is implemented by washing machine 810 and/or drying machine 812 of FIG. 8.

At 902, a cleaning machine identifies at least one textile article contained within a load of articles by extracting information from at least one RFID tag that is affixed to the textile article. The textile article may be a wearable textile article or a non-wearable textile article. For example, the wearable textile articles can include RFID tags that are mounted or attached to the wearable textile article. In turn, an RFID reader included in the cleaning machine is able to identify, validate, and/or extract information from an RFID tag as further described herein. In some embodiments, the RFID tag includes direct information that identifies the textile article, while in other embodiments, the RFID tag includes indirect information (e.g., a manufacture's address) that can be used by the RFID reader or cleaning machine to obtain information that identifies the textile article. Some embodiments not only identify a single textile article, but additionally identify additional wearable textile articles contained within the load.

At 904, cleaning settings of the article or articles are determined based upon the information. Some cleaning settings can be obtained directly from an RFID tag, while other cleaning settings can be obtained indirectly from the RFID tag via an address included on an RFID tag. Determining the cleaning settings can sometimes include a cleaning machine exchanging information over a network using the address to obtain some of the washing settings from a server located at the address, as further described herein.

At 906, the cleaning machine determines whether the cleaning settings of the identified textile articles are compatible. This can be done by determining compatibility with one or more of cleaning settings of articles within the load of articles or cleaning settings of the cleaning machine. This can include identifying compatible and/or incompatible colors, temperature settings, and so forth. If it is determined that the cleaning settings are not compatible (e.g., incompatible), the cleaning machine can optionally determine whether to use default settings that are considered safe for a mixed load at 908. If the cleaning machine decides to use default settings, the method then proceeds to 910.

At 910, the cleaning machine automatically configures a cleaning cycle without user intervention. This can include configuring washing settings used by a washing machine, or drying settings used by a drying machine. If, on the other hand, default settings cannot be used or the default settings are not an available option, a user can be provided with a notification at 912. If, on the other hand, at 906 the cleaning settings are determined to be compatible, the compatible settings determined at 904 are used. Some embodiments automatically start a cleaning cycle as part of the configuration process, while other embodiments wait for user input to begin.

At 912, the cleaning machine can also optionally provide a notification to the user after configuring or completing the cleaning cycle. For example, notifications can be provided that update a status of the cleaning cycle, such as "Cycle Automatically Started", "Waiting for User Input", "Cycle Completed", and so forth. The notifications can be provided on a local display or can be provided on a remote display and/or to a remote application.

Cleaning machines that automatically identify cleaning settings for a load of laundry lower a risk of damaging clothing, and further provide a user with an automated mechanism to clean clothes. For example, if a user inadvertently includes a red sock in a white load of clothing being washed, the red sock can be detected and the user notified before a wash cycle is run that could alter the coloring of the white clothes to pink or red. Similarly, a dry-clean only garment in a dryer can be detected before a hot temperature dry cycle starts that would otherwise shrink the garment. Thus, automatic detection of cleaning settings, as well as automation of the cleaning process, provides a user with a more reliable and safe way to clean garments.

Having considered embodiments that employ smart textile cleaning, consider now an example device that can be utilized to implement one or more embodiments.

Example Device

Figure 10:
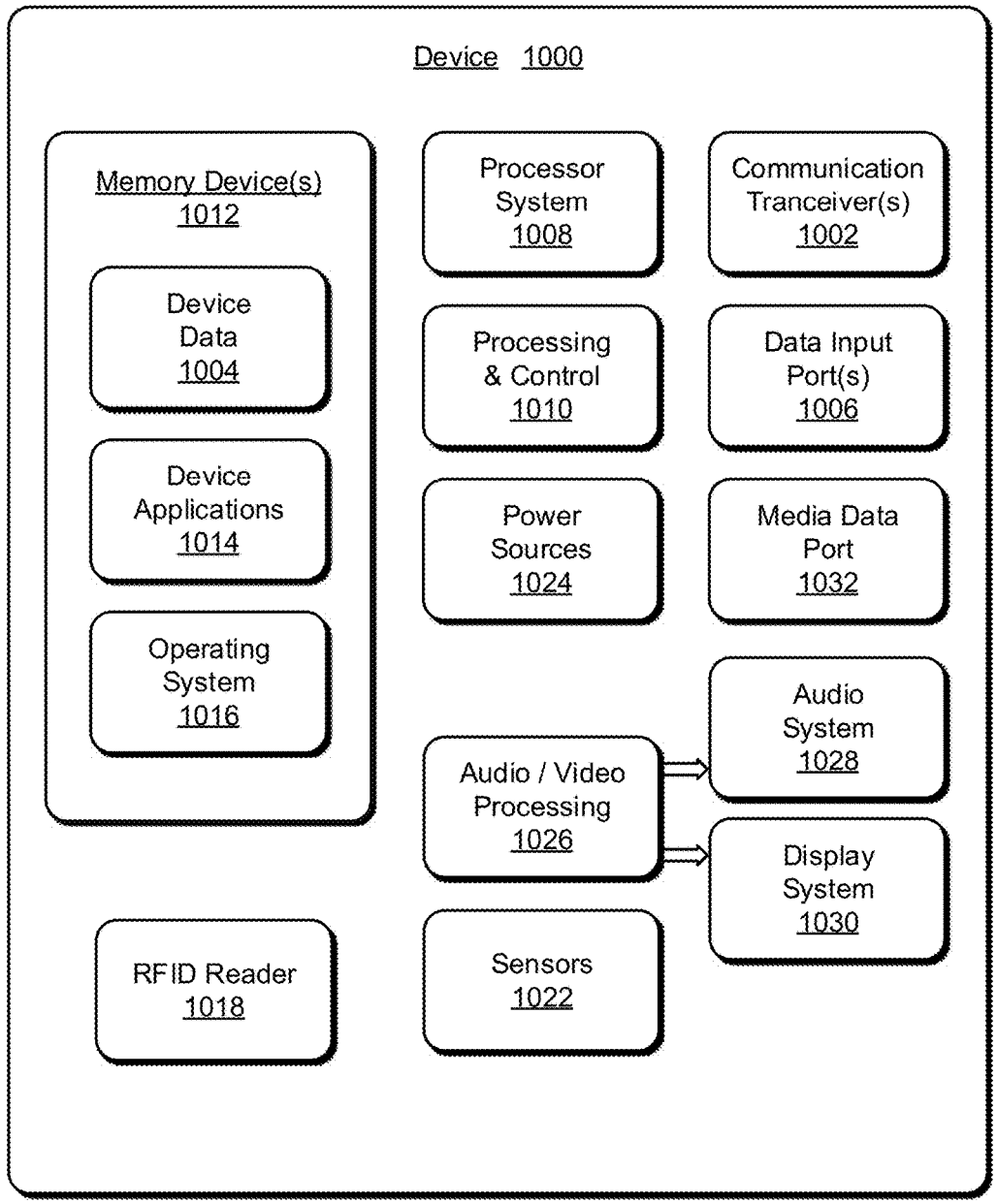
FIG. 10 illustrates various components of an example device that can implement embodiments smart clothes cleaning.

FIG. 10 illustrates various components of an example device 1000 in which embodiments of smart clothes cleaning can be implemented. The example device 1000 can be implemented as a smart cleaning machine as described above.

The device 1000 includes communication transceivers 1002 that enable wired and/or wireless communication of device data 1004 with other devices. Additionally, the device data can include any type of audio, video, and/or image data. Example transceivers include wireless personal area network (WPAN) radios compliant with various IEEE 802.15

(Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 1000 may also include one or more data input ports 1006 via which any type of data, media content, and/or inputs can be received, such as user-selectable inputs to the device, messages, and the like. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1000 includes a processing system 1008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternately or in addition, the device can be implemented with any one or combination of software, hardware, firmware, or fixed logic circuitry that is implemented in connection with processing and control circuits, which are generally identified at 1010. The device 1000 may further include any type of a system bus or other data and command transfer system that couples the various components within the device. A system bus can include any one or combination of different bus structures and architectures, as well as control and data lines.

The device 1000 also includes computer-readable storage memory devices 1012 that enable data storage, such as data storage devices that can be accessed by a computing device, and that provide persistent storage of data and executable instructions (e.g., software applications, programs, functions, and the like). Examples of the computer-readable storage memory devices 1012 include volatile memory and non-volatile memory, fixed and removable media devices, and any suitable memory device or electronic data storage that maintains data for computing device access. The computer-readable storage memory devices can include various implementations of random access memory (RAM), read-only memory (ROM), flash memory, and other types of storage media in various memory device configurations. The device 1000 may also include a mass storage media device.

The computer-readable storage memory devices 1012 provide data storage mechanisms to store the device data 1004, other types of information and/or data, and various device applications 1014 (e.g., software applications). For example, an operating system 1016 can be maintained as software instructions with a memory device and executed by the processing system 1008. The device applications may also include a device manager, such as any form of a control application, software application, signal-processing and control module, code that is native to a particular device, a hardware abstraction layer for a particular device, and so on. Device 1000 also includes one or more RFID readers 1018 that operate as described above.

The device 1000 can also include one or more device sensors 1022, such as any one or more of an ambient light sensor, a proximity sensor, a touch sensor, an infrared (IR) sensor, and the like. The device 1000 can also include one or more power sources 1024. The power sources may include a charging and/or power system, and can be implemented as a flexible strip battery, a rechargeable battery, a charged super-capacitor, and/or any other type of active or passive power source.

The device 1000 also includes an audio and/or video processing system 1026 that generates audio data for an audio system 1028 and/or generates display data for a display system 1030. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1032. In implementations, the audio system and/or the display system are integrated components of the example device. Alternatively, the audio system and/or the display system are external, peripheral components to the example device.

Although embodiments of RFID tags in a wearable and smart clothes cleaning have been described in language specific to features and/or methods, the subject of the appended claims is not necessarily limited to the specific features or methods described. Rather, the specific features and methods are disclosed as example implementations and other equivalent features and methods are intended to be within the scope of the appended claims. Further, various different embodiments are described and it is to be appreciated that each described embodiment can be implemented independently or in connection with one or more other described embodiments.

The invention claimed is:

1. An article of manufacture comprising:
   a wearable, stretchable textile article comprising stretchable material selected from a group comprising: spandex, vinyl, velvet, denim, cotton, wool, or polyester;
   at least one RFID tag mounted on the wearable, stretchable textile article; and
   a stretch-activated switch on the at least one RFID tag, the stretch-activated switch having a first mode and a second mode, the first mode being associated with a first RFID tag state and the second mode being associated with a second RFID tag state, wherein the stretch-activated switch comprises a ground contact, an RFID enable contact and a contact to slidably engage the ground contact and the RFID enable contact to transition between the first RFID tag state and the second RFID tag state.

2. The article of manufacture as recited in claim 1, wherein:
   the first mode corresponds to one of a stretched mode or an un-stretched mode, and the second mode corresponds to the other of the stretched mode or un-stretched mode;
   wherein the stretched mode is a mode in which the wearable, stretchable textile article is stretched, and
   the un-stretched mode is a mode in which the wearable, stretchable, textile article is not stretched.

3. The article of manufacture as recited in claim 1, wherein the first RFID tag state corresponds to one of an activated state or an un-activated state, and the second RFID tag state corresponds to the other of the activated state or un-activated state;
  wherein the activated state corresponds to a state in which the at least one RFID tag is operational and the un-activated state corresponds to a state in which the RFID tag is less or differently operational than the activated state.

4. The article of manufacture as recited in claim 3, wherein the activated state corresponds to an operational state in which the at least one RFID tag can perform operations including one or more of: collecting data, receiving transmitted data, or transmitting data.

5. The article of manufacture as recited in claim 3, wherein the un-activated state corresponds to a state in which the at least one RFID tag is not operational.

6. The article of manufacture as recited in claim 1, wherein the stretch-activated switch comprises:
  a first layer comprising:
    the ground contact; and
    the RFID enable contact; and
  a second layer comprising:
    the contact;
  wherein the contact on the second layer is configured to span the ground contact and RFID enable contact on the first layer to ground the RFID enable contact so that the RFID tag is in an un-activated state; and
  wherein the first and second layers are slidable relative to one another to slidably disengage the contact on the second layer from the RFID enable contact on the first layer so that the RFID tag is in an activated state.

7. The article of manufacture as recited in claim 6, wherein the activated state corresponds to an operational state in which the at least one RFID tag can perform operations including one or more of: collecting data, receiving transmitted data, or transmitting data.

8. An article of manufacture comprising:
  a wearable, stretchable synthetic textile article;
  at least one RFID tag mounted on the wearable, stretchable textile article; and
  a stretch-activated switch on the at least one RFID tag, the stretch-activated switch having a first mode and a second mode, the first mode being associated with a first RFID tag state and the second mode being associated with a second RFID tag state, wherein the stretch-activated switch comprises a ground contact, an RFID enable contact and a contact to slidably engage the ground contact and the RFID enable contact to transition between the first RFID tag state and the second RFID tag state.

9. The article of manufacture as recited in claim 8, wherein:
  the first mode corresponds to one of a stretched mode or an un-stretched mode, and the second mode corresponds to the other of the stretched mode or un-stretched mode;
  wherein the stretched mode is a mode in which the wearable, stretchable textile article is stretched, and
  the un-stretched mode is a mode in which the wearable, stretchable, textile article is not stretched.

10. The article of manufacture as recited in claim 8, wherein the first RFID tag state corresponds to one of an activated state or an un-activated state, and the second RFID tag state corresponds to the other of the activated state or un-activated state;
  wherein the activated state corresponds to a state in which the at least one RFID tag is operational and the un-activated state corresponds to a state in which the RFID tag is less or differently operational than the activated state.

11. The article of manufacture as recited in claim 10, wherein the activated state corresponds to an operational state in which the at least one RFID tag can perform operations including one or more of: collecting data, receiving transmitted data, or transmitting data.

12. The article of manufacture as recited in claim 10, wherein the un-activated state corresponds to a state in which the at least one RFID tag is not operational.

13. The article of manufacture as recited in claim 8, wherein the stretch-activated switch comprises:
  a first layer comprising:
    the ground contact; and
    the RFID enable contact; and
  a second layer comprising:
    the contact;
  wherein the contact on the second layer is configured to span the ground contact and RFID enable contact on the first layer to ground the RFID enable contact so that the RFID tag is in an un-activated state; and
  wherein the first and second layers are slidable relative to one another to slidably disengage the contact on the second layer from the RFID enable contact on the first layer so that the RFID tag is in an activated state.

14. The article of manufacture as recited in claim 13, wherein the activated state corresponds to an operational state in which the at least one RFID tag can perform operations including one or more of: collecting data, receiving transmitted data, or transmitting data.

15. An article of manufacture comprising:
  a wearable, stretchable natural textile article;
  at least one RFID tag mounted on the wearable, stretchable textile article; and
  a stretch-activated switch on the at least one RFID tag, the stretch-activated switch having a first mode and a second mode, the first mode being associated with a first RFID tag state and the second mode being associated with a second RFID tag state, wherein the stretch-activated switch comprises a ground contact, an RFID enable contact and a contact to slidably engage the ground contact and the RFID enable contact to transition between the first RFID tag state and the second RFID tag state.

16. The article of manufacture as recited in claim 15, wherein:
  the first mode corresponds to one of a stretched mode or an un-stretched mode, and the second mode corresponds to the other of the stretched mode or un-stretched mode;
  wherein the stretched mode is a mode in which the wearable, stretchable textile article is stretched, and
  the un-stretched mode is a mode in which the wearable, stretchable, textile article is not stretched.

17. The article of manufacture as recited in claim 15, wherein the first RFID tag state corresponds to one of an activated state or an un-activated state, and the second RFID tag state corresponds to the other of the activated state or un-activated state;
  wherein the activated state corresponds to a state in which the at least one RFID tag is operational and the un-activated state corresponds to a state in which the RFID tag is less or differently operational than the activated state.

18. The article of manufacture as recited in claim 17, wherein the activated state corresponds to an operational state in which the at least one RFID tag can perform operations including one or more of: collecting data, receiving transmitted data, or transmitting data.

19. The article of manufacture as recited in claim 18, wherein the un-activated state corresponds to a state in which the at least one RFID tag is not operational.

20. The article of manufacture as recited in claim 15, wherein the stretch-activated switch comprises:
   a first layer comprising:
      the ground contact; and
      the RFID enable contact; and
   a second layer comprising:
      the contact;
   wherein the contact on the second layer is configured to span the ground contact and RFID enable contact on the first layer to ground the RFID enable contact so that the RFID tag is in an un-activated state; and
   wherein the first and second layers are slidable relative to one another to slidably disengage the contact on the second layer from the RFID enable contact on the first layer so that the RFID tag is in an activated state.

* * * * *